April 23, 1940.  S. A. SNELL  2,197,903
MECHANISM CONTROL
Filed July 7, 1936  3 Sheets-Sheet 1
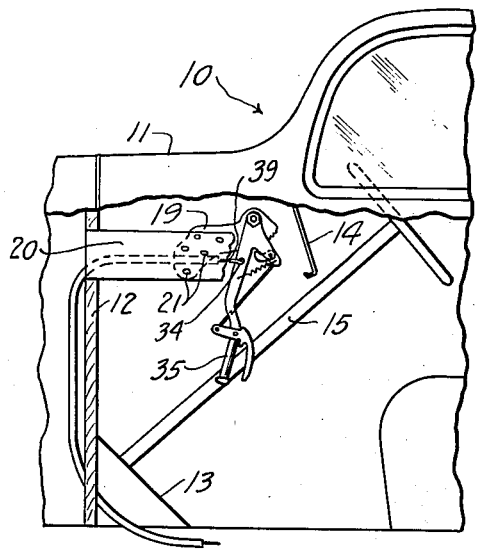
FIG. 1.
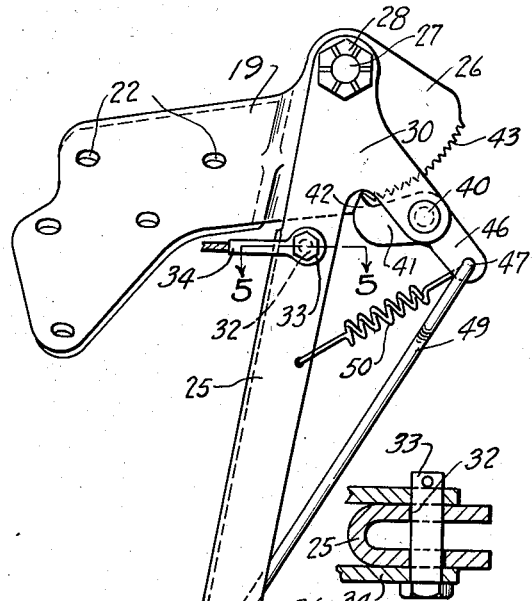
FIG. 5.
FIG. 3.
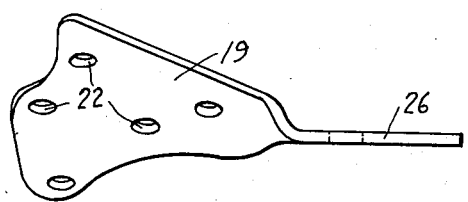
FIG. 6.
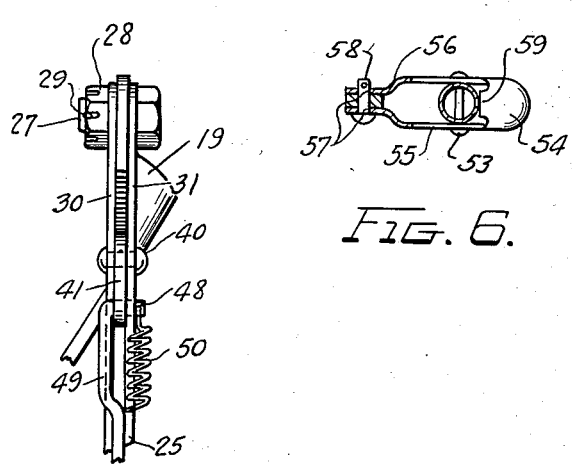
FIG. 2.
FIG. 4.
INVENTOR.
Samuel A. Snell
BY Braselton, Whitcomb & Davies
ATTORNEYS.

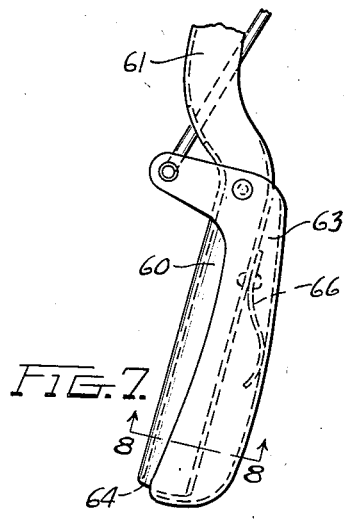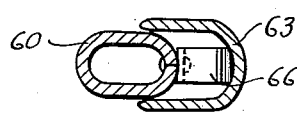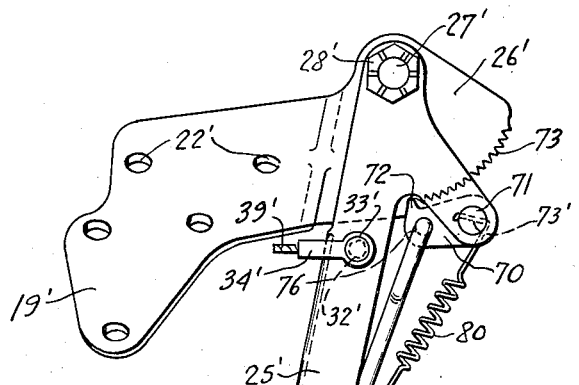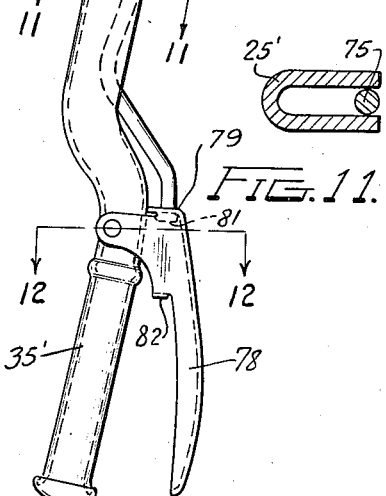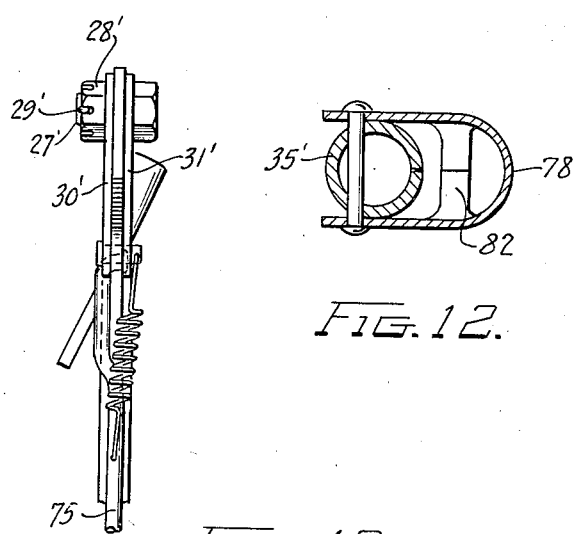

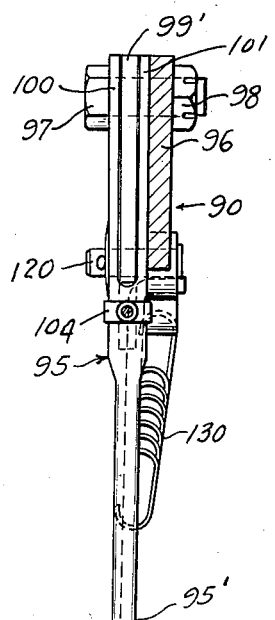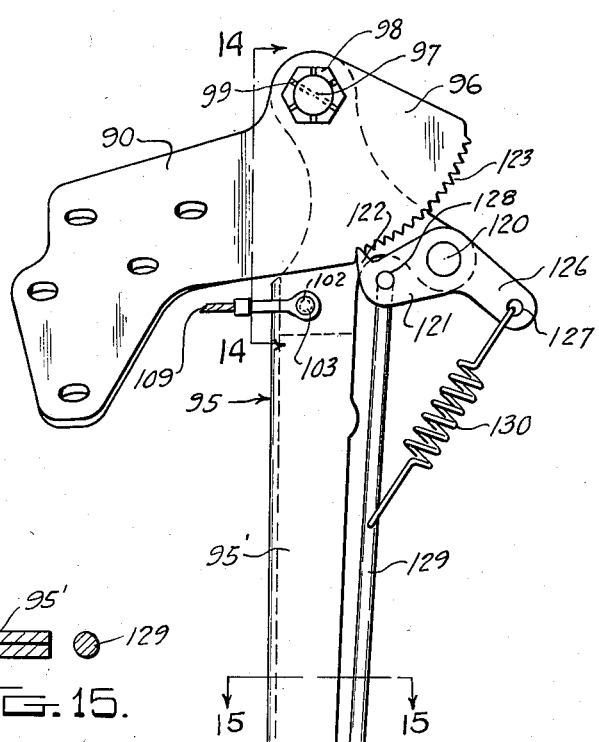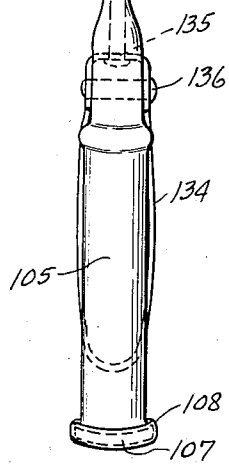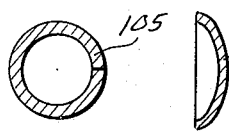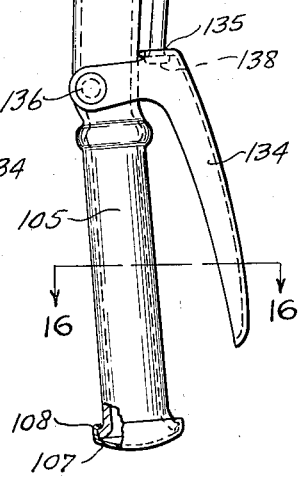

Patented Apr. 23, 1940

2,197,903

UNITED STATES PATENT OFFICE 2,197,903

MECHANISM CONTROL

Samuel A. Snell, Toledo, Ohio, assignor, by mesne assignments, to The Logan Gear Company, a corporation of Ohio Application July 7, 1936, Serial No. 89,343

6 Claims. (Cl. 74—537)

This invention relates to a mechanism control and particularly to a lever mechanism of a type adapted for vehicle brake control or other apparatus.

The invention contemplates the provision of a lever mechanism for controlling a brake mechanism of a vehicle wherein the lever arrangement may be supported adjacent the instrument board of a vehicle whereby the lever depends from its support, the manipulating portion thereof being arranged in a position convenient to the vehicle operator.

The invention has for an object the provision of a lever construction of this character which may be formed from comparatively thin sheet material into desired strengthening configuration and the parts arranged whereby the cost of assembly and installation is substantially decreased.

The invention also embraces the provision of a lever mechanism incorporating simple and effective means for retaining or locking the lever in desired operative position, which means may be easily and quickly released.

Another object of the invention is the provision of a clutch mechanism for holding the lever in adjusted position which is adapted to be released by a comparatively slight movement of an element associated with the lever member.

A further object resides in the provision of a lever member for operating an emergency brake of a vehicle in which a clutch releasing element is pivotally connected with the lever member and overlaps or obscures from view a substantial portion of the grip member of the lever, thus eliminating the necessity for a fine finish upon portions of the lever member.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a fragmentary side elevational view of a forward portion of an automotive vehicle, part of the body wall being broken away to illustrate a form of my invention and the arrangement of mounting the same in the vehicle;

Figure 2 is a side elevational view of one form of the mechanism control of my invention;

Figure 3 is a top plan view of a form of support forming a part of the invention;

Figure 4 is a front elevational view of the upper portion of the construction illustrated in Figure 2;

Figure 5 is an enlarged sectional view taken substantially on the line 5—5 of Figure 2;

Figure 6 is a transverse sectional view taken substantially on the line 6—6 of Figure 2;

Figure 7 is a side elevational view showing a modified form of manipulating arrangement for the clutch mechanism forming a part of my invention;

Figure 8 is a transverse sectional view taken substantially on the line 8—8 of Figure 7;

Figure 9 is a side elevational view similar to Figure 2 showing a modified form of the invention;

Figure 10 is a front elevational view of the upper portion of the lever construction shown in Figure 9;

Figure 11 is a transverse sectional view taken substantially on the line 11—11 of Figure 9;

Figure 12 is a transverse sectional view taken substantially on the line 12—12 of Figure 9;

Figure 13 is a side elevational view illustrating a further form of the invention;

Figure 14 is a vertical sectional view taken substantially on the line 14—14 of Figure 13;

Figure 15 is a transverse sectional view taken on the line 15—15 of Figure 13;

Figure 16 is a transverse sectional view taken on the line 16—16 of Figure 13.

While I have shown the mechanism control of my invention as particularly utilized as a means of emergency brake control for automotive vehicles, it is to be understood that I contemplate the utilization of the invention with any type of mechanism where the control may be found to be usable.

Referring to the drawings in detail and particularly Figure 1, I have illustrated the forward portion 10 of an automotive vehicle body of conventional design having a cowl portion 11, a dash portion 12, toe board 13, instrument panel 14, and steering post or column 15. I have found it desirable to position an emergency brake control mechanism in such a manner that the same may be conveniently operated by the driver of the vehicle and yet be located in a position which will not impede or handicap the normal driving operations of the operator. In the embodiment of the invention illustrated, the lever mechanism is preferably mounted adjacent the side wall of the vehicle body and is carried by a support or bracket 19 secured to the cowl frame construction 20 or other suitable portion of the vehicle. The lever mechanism supporting member is preferably mounted forwardly of the instrument panel 14 as viewed from the vehicle operator's position and is held in place by means of rivets 21 passing through openings 22 in the supporting element illustrated in Figure 2.

The bracket or support 19 in the present form of the invention provides a supporting means for the lever mechanism as well as a part of the clutch mechanism. The lever mechanism is inclusive of a lever or lever member 25 which is pivotally connected to a uniplanar portion 26 of bracket 19 by means of a bolt or pintle 27 held in place by suitable means as, for example, a nut 28. Inadvertent removal of the nut is prevented by means of a cotter key 29 cooperating with a castellated formation of the nut 28. The lever member 25 is preferably formed of sheet metal and is generally of a U-shaped configuration as illustrated in Figure 5, throughout a substantial portion of its length, the upper end of the lever terminating in spaced parallel wall portions or projections 30 and 31 which straddle the uniplanar portion 26 of the supporting member 19 as particularly shown in Figures 2 and 4.

The lever body 25 extends downwardly from the support and preferably terminates in a handle or grip portion 35, the lever having a curved portion 36 joining the body of the lever to the grip portion which is of a configuration to permit the grip portion to be positioned as close to the vehicle operator as practical. The grip portion of the lever, as shown in Figure 2, is preferably of hollow formation and may be closed at its lower end by means of a cap 37 flanged as at 38 to hold the same in place upon the grip portion.

The spaced parallel wall portions 30 and 31 of the lever member are provided with openings adapted to receive a pin or pintle 40 upon which is journalled a pawl or clutch element 41 having a tooth or projection 42 cooperating with a clutch surface or series of ratchet shaped teeth 43 preferably formed upon a lower edge of the uniplanar portion 26 of support 19, however, the clutching surface or teeth may constitute an independent member if desired. The pawl and ratchet teeth together form a clutching means for holding the lever member 25 in adjusted position. The lever member 25 is also provided with openings 32 adapted to accommodate a pin 33 which passes through a clevis member 34 connected to an operating cable 39 which in turn may be connected to the brake mechanism of the vehicle (not shown).

The pawl 41 is formed with an extension 46 having an opening 47 therein to receive an inturned end of an operating rod or link element 49. An opening 48 may be provided in the link 49 to receive an end portion of a contractile spring 50, the other end of which is suitably connected to the body portion of the lever member 25, the spring 50 serving to pull the projection 46 downwardly and force the tooth 42 into engagement with the ratchet teeth 43. The rod or link 49 preferably extends downwardly toward the curved portion 36 of the lever body and extends through an opening 52 provided in the lever body to permit free movement of the rod therethrough.

Adjacent the handle portion 35 is a spoon shaped clutch or pawl releasing member 54 which is pivoted thereto as at 53 and is provided with a pair of spaced substantially parallel projections 55 and 56 having aligned openings 57 in their end portions to receive a pin 58 for securing the other end of rod or link 49 to the clutch releasing member 54. It will thus be noted that by gripping the handle 35 and the member 54 and squeezing the same together that the rod 49 will be moved upwardly to actuate the pawl member and move the tooth 42 downwardly and out of engagement with the ratchet teeth 43, thus effecting a release of the vehicle braking elements. As particularly shown in Figures 2 and 6, the member 54 is provided with stop members 59 and 62, the stop 59 being held in engagement with the walls of the lever by the spring 50 to eliminate lost motion and prevent rattling of the parts. Stop member 62 limits the movement of member 54 toward pawl releasing position upon engagement of handle portion 35.

Referring now to Figures 7 and 8 another form of releasing mechanism has been illustrated wherein the handle portion 60 of the lever member 61 is partially surrounded by a deeply spoon shaped element 63, which is pivoted to the handle and secured to the pawl releasing connection in a manner similar to that above described in connection with Figure 2. The handle portion 60 is formed by folding the walls of the lever into proper configuration and holding the same in place by suitable means such as welding. In this form of the invention, as shown in Figure 8, it will be noted that the handle portion 60 terminates in an open ended hollow handle portion 64 which arrangement provides a simple yet effective grip portion. Such an arrangement is possible due to the fact that the lower extremity of the element 63 practically encloses the end of the handle portion 60 in substantially all of its operating positions. Positioned between the handle portion 60 and an interior wall of the spoon element 63 is a spring 66 in the form of a tension plate preferably secured to the handle, a convenient method of securing the spring in place such as riveting being employed. The spring 66 in this instance also serves to eliminate lost motion or rattling of the parts. Although a flat type spring has been illustrated, other types of springs may be used if desired.

In the form of the invention illustrated in Figures 9 to 12, inclusive, a bracket or support 19' similar to the bracket previously described may be employed in which a plurality of openings 22' have been provided to secure the bracket to a convenient portion of the vehicle. The lever mechanism includes a lever member 25' formed of sheet metal, the upper portion of which terminates in a pair of substantially parallel wall portions or projections 30' and 31' straddling the uniplanar portion 26' of the bracket 19', the end portions of projections 30' and 31' having openings therein to receive a bolt 27' upon which may be threaded nut 28' suitably locked thereon by means of a cotter key 29' whereby the lever 25' is pivoted upon the support 19'.

A pawl or clutch member 70 is pivotally connected to a portion of the projections 30' and 31' by means of a suitable pin 71, the pawl being provided with a tooth or projection 72 engageable with the ratchet teeth or clutch surface 73 formed on the uniplanar portion of the support 19'. An operating rod or link element 75 is connected to the pawl 70 through an opening 76 adjacent the tooth portion 72 and in this form of the invention the rod 75 preferably extends toward the lever member 25 and then outwardly terminating within and suitably secured to a releasing or manipulating element 78. The releasing element 78 is preferably spoon shaped and is provided with a pair of projections which are pivotally connected to the lever member 25' adjacent its handle portion 35'. The member 78 is preferably formed with a lip or ledge portion 79 having an opening therein to receive the end of rod 75 which is provided with a head portion 81 to retain the rod in position. Ledge 79 also serves as a stop means for limiting the return movement of member 78. In order to insure engagement between the tooth 72 of pawl 70 and the ratchet teeth 73 a spring 80 is suitably connected to the pivot member 71 and to the clutch operating rod 75, such an arrangement serving to urge the rod 75 and thus the pawl 72 upwardly. A convenient method of securing the spring 80 to the pivot 71 and rod 75 is through the medium of small openings 73' and 76' in the pin and rod respectively and through which openings the ends of the spring 80 are projected and retained.

The member 78 is preferably provided with inwardly projecting lugs or portions 82 as particularly illustrated in Figures 9 and 12 forming stop means for limiting the pivotal movement of member 78 toward pawl releasing position. With this arrangement the liability of an operator's glove to become caught between the grip member and the pawl releasing member is minimized. The lever member 25' is also provided with openings 32' adapted to accommodate a pin 33' which passes through a clevis member 34' connected to a brake operating cable 39' which in turn may be connected to the brake mechanism of the vehicle (not shown).

In the form of the invention illustrated in Figures 13 to 16, inclusive, a bracket or support 90 carries the lever arrangement and forms a portion of the clutch mechanism. The lever mechanism is inclusive of a lever or lever member 95 which is pivotally connected to a uniplanar portion 96 of the bracket 90 by means such as a bolt 97 held in place by a nut 98. The nut 98 is retained on the bolt by means of a cotter key 99 and inadvertent removal is thus prevented. The lever body 95 is formed of folded sheet metal and is of a configuration having an intermediate portion flattened or compressed together to form a bar like portion 95'. The upper portion of the lever preferably terminates in a pair of substantially parallel wall portions or projections 100 and 101 and included between the projections is a member 99'. The lever in this form of the invention is arranged at one side of the bracket 90. By the utilization of a member 99' between the projections 100 and 101 a longer bearing is provided for the bolt 97.

The lever 95 extends downwardly and terminates in a hand grip or handle portion 105 of hollow configuration, the handle portion 105 being preferably slightly offset from the axis of the body portion of the lever so as to permit the same to be positioned as close to the vehicle operator as practical. The lower end of the handle portion may be closed by means of a cap 107 flanged as at 108 to hold the same in place upon the lower extremity of the grip portion.

The spaced projections 100 and 101 of the lever body and the member 99' are provided with openings adapted to receive a pin 120 upon which is journalled a pawl member 121 having a tooth or projection 122 cooperating with a series of ratchet teeth 123 or clutch surface formed upon a lower edge portion of the bracket 90, the pawl and ratchet teeth cooperating to form a clutching means for holding the lever member 95 in adjusted position. Openings 102 are provided in the lever body 95 to accommodate a pin 103 to which is connected a clevis member 104 connected to an operating cable 109 which is in turn connected to the braking mechanism (not shown) of the vehicle.

The pawl 121 is formed with an extension 126 having an opening 127 therein to receive an end portion of a spring member 130, the other end of which is suitably connected to an operating rod or link 129. The spring serves to urge the pawl into engagement with the ratchet teeth and also to place a stress or tension upon the several elements of the pawl releasing mechanism to eliminate vibration or rattling of the parts. The pawl 121 is provided with an opening 128 adjacent the tooth 122 to receive an angularly disposed end of the rod 129. The rod 129 extends downwardly and is secured within an opening 135 in a spoon shaped releasing member 134 pivotally connected to the lever body 95 as at 136. The rod 129 is provided with a head portion 138 to retain the rod in operative connection with the releasing member. As in the other forms of the invention, the projection 122 is released from engagement with the ratchet teeth by squeezing the handle portion of the lever member and the releasing member 134 together which action moves the rod 129 downwardly and thus withdraws the pawl from engagement with the ratchet teeth. In this form of the invention the control rod 129 lies substantially parallel to the lever body 95 being spaced therefrom a sufficient distance to prevent rattling of the metallic elements.

In the forms of the invention herein I have found it highly advantageous to utilize a lever member of the second class or order which permits of a maximum application of power to the braking system with a comparatively short lever member. With this type of lever the ratchet clutch mechanism being arranged below the fulcrum or pivotal support of the lever makes possible the use of ratchet teeth of a size and space practicable for a mechanism control of this character.

It is apparent that, within the scope of the invention, modifications and different arrangements may be made other than is herein disclosed, and the present disclosure is illustrative merely, the invention comprehending all variations thereof.

What I claim is:

1. In combination, a mechanism control including a support having a serrated portion; a lever member formed of sheet metal having portions straddling said support and pivotally connected thereto; pawl means pivotally carried by said lever member and engageable with the serrated portion of said support; a pawl releasing member of substantially U-shaped cross section pivotally connected to said lever member, said pawl releasing member being pivoted adjacent the lower portion of said lever member; a projection on said pawl means; a link connected between said projection and said pawl releasing member; said link passing through an opening in a wall of said lever and resilient means coacting with said pawl means for normally urging said pawl releasing member to one position.

2. In combination, a mechanism control including a support having a serrated portion; a lever member formed of sheet metal having portions straddling said support and connected thereto; pawl means pivotally carried by said lever member and engageable with the serrated portion of said support; a pawl releasing member connected to said lever member, said pawl releasing member having a hand grip portion adjacent the lower portion of said lever member; a connecting rod between said pawl means and said pawl releasing member passing through an opening in said lever member; and spring means for normally urging said pawl means into engagement with the serrated portion of said support.

3. In combination, a mechanism control including a support having ratchet teeth; a sheet metal lever member of substantially U-shaped configuration throughout a major portion of its length, said lever member having projecting side wall portions straddling said support and pivotally connected thereto; pawl means carried by said lever member and cooperating with a serrated portion of said support to form lever retaining means; a pawl releasing member pivotally connected to said lever member and having a U-shaped lower portion partially surrounding the lower portion of said lever member; and an operating link between said pawl means and said pawl releasing member.

4. In combination, a brake mechanism control including a support having a plurality of ratchet teeth on a depending edge thereof; a lever member pivoted at its upper extremity to the support and having a grip portion formed at its lower end; a clevis member pivotally connected to said lever intermediate its ends and adapted to be connected to a brake mechanism; pawl means connected to the lever member intermediate the point of pivotal connection of the lever with the support and its grip portion, said pawl means being arranged for cooperation with the teeth on said support to hold the lever in adjusted position; a manipulating member for actuating said pawl means pivotally connected to the lever member and having a hand grip portion coextensively arranged with the grip portion of said lever member; an actuating rod connecting said pawl means and said manipulating member; resilient means for normally urging said pawl means into engagement with the teeth upon said support; said pawl actuating member having stop means for limiting the pivotal movement thereof towards and away from grip portion of said lever.

5. In combination, a mechanism control including a support having a downwardly extending toothed edge portion; a lever member of the second order formed of sheet material having parallel portions straddling said support and pivotally connected thereto; said lever depending from said support, said lever member terminating at its lower portion in a grip portion, said lever member being of U-shaped configuration throughout a major portion of its length; a pawl pivotally mounted upon said lever between the side walls thereof and adapted for engagement with the toothed portion of said support; a manipulating handle pivoted to the lower portion of said lever member, said handle having a stop for limiting its pivotal movement toward the grip portion of said lever; a link connecting said handle and said pawl; and a coil spring coacting with said pawl and having one end connected to the body portion of said lever for normally urging said pawl member into engagement with the teeth on said support.

6. In combination, a mechanism control including a support having a vertically arranged uniplanar portion; said uniplanar portion having a toothed edge portion; a lever member formed of sheet material pivotally connected at its upper extremity to said support and depending therefrom, said lever member terminating at its lower portion in a hollow grip portion; a mechanism actuating element connected to said lever between its point of connection with the support and the grip portion, said lever member being of U-shaped configuration throughout a major portion of its length; a pawl pivoted to said lever member between its pivotal connection with said support and the grip portion and adapted for engagement with the teeth of said support; a pawl actuating member pivoted to said lever member; a link connecting said pawl and said pawl actuating member, said link passing through an opening in a wall of said lever; and a coil spring having its ends acting respectively on said pawl and said lever for normally urging the pawl into engagement with the teeth on the support.

SAMUEL A. SNELL.